Figure 1:
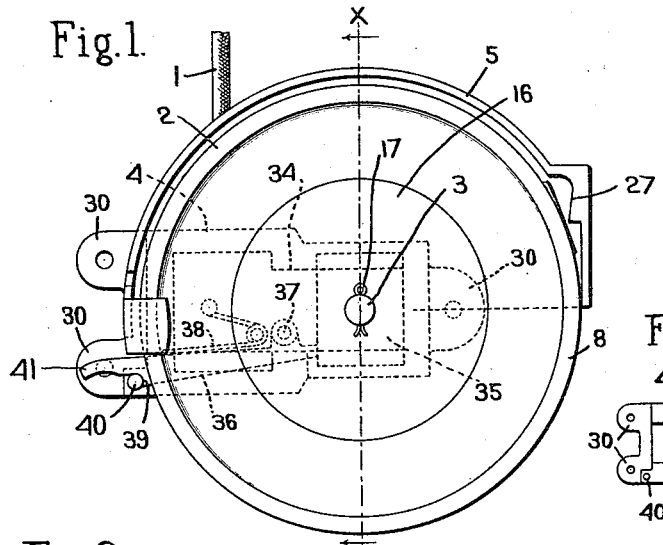

F. J. ROCHE.
TROLLEY CATCHER.
APPLICATION FILED JUNE 4, 1914.

1,173,684.

Patented Feb. 29, 1916.

Witnesses.
J. Morrill Fuller
William E. Hagen

Inventor.
Francis J. Roche,
by Heard Smith & Tennant.
Atty's.

THE COLUMBIA PLANOGRAPH CO., WASHINGTON, D. C.

UNITED STATES PATENT OFFICE.

FRANCIS J. ROCHE, OF SOMERVILLE, MASSACHUSETTS.

TROLLEY-CATCHER.

1,173,684.  Specification of Letters Patent.  Patented Feb. 29, 1916.

Application filed June 4, 1914. Serial No. 843,070.

*To all whom it may concern:*

Be it known that I, FRANCIS J. ROCHE, a citizen of the United States, residing at Somerville, county of Middlesex, State of Massachusetts, have invented an Improvement in Trolley-Catchers, of which the following description, in connection with the accompanying drawing, is a specification, like characters on the drawing representing like parts.

This invention relates to trolley catchers and has for its object to provide a novel trolley catcher which is simple and comparatively inexpensive to manufacture, which will stand up under the severe strain to which trolley catchers are frequently subjected and which is accurate and positive in its operation.

A trolley catcher embodying my invention has the reel portion thereof provided with one or more stop shoulders and the reel-supporting member provided with a laterally-moving stop member which normally occupies a position out of the path of movement of the stop shoulder, but which is thrown into the path of movement thereby to stop the reel when the reel begins to rotate at a predetermined speed.

In order to give a proper understanding of my invention I have illustrated in the drawings a selected embodiment thereof which will now be described, it being understood, however, that the invention is not limited to the constructional features shown.

Figure 5:
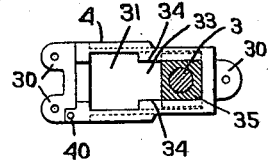
Figure 2:
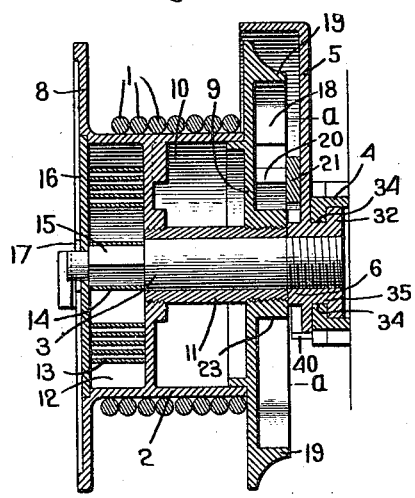
Figure 3:
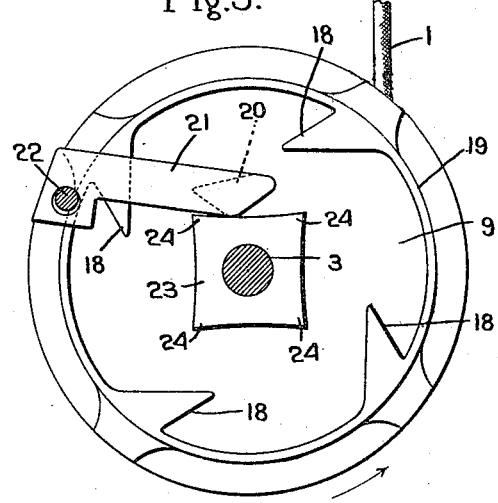
Figure 4:
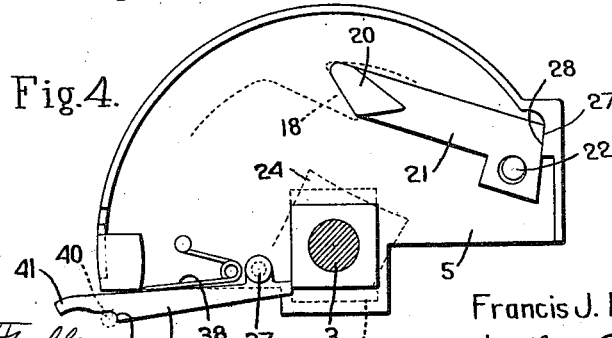

Figure 1 of the drawings shows the front view of a trolley catcher embodying my invention; Fig. 2 is a section on the line x—x, Fig. 1; Fig. 3 is an end view of the device with the member 5 omitted; Fig. 4 is a section on the line a—a, Fig. 2; Fig. 5 is a detail of the bracket or holder which is secured to the car and by which the trolley catcher is sustained.

Trolley catchers are usually provided with a spring-actuated reel on which the trolley rope is wound, and suitable means to lock the reel from rotation in a direction to unwind the rope therefrom whenever the speed of rotation of the reel exceeds a predetermined limit, so that if the trolley wheel jumps the trolley wire the consequent rapid unwinding movement of the trolley rope will throw the lock into operative position and thus lock the reel from unwinding.

In my invention I have provided a locking device comprising one or more stop shoulders on the reel and a movable stop member carried by the reel support and arranged to be thrown into the path of movement of the stop shoulder or shoulders whenever the unwinding movement of the reel exceeds a certain predetermined speed.

In the drawings the spring-actuated reel on which the trolley rope 1 is wound is shown generally at 2, and it is rotatably sustained on a stud 3 extending from a reel-supporting member. This reel-supporting member may have any suitable or usual construction and is adapted to be detachably secured to a bracket or holder 4 secured to the trolley car. The reel-supporting member herein shown comprises a plate or body portion 5 which is illustrated as semi-circular in shape, although this particular form is not essential to the invention. The member 5 has a central hub 6 in which the stud or pin 3 is screwed, as seen best in Fig. 3. The spring-actuated reel 2 may be constructed in any suitable way. A construction which facilitates manufacture and assembly is shown in the drawing and comprises a body portion 10 having the rope-receiving portion and a flange 8 formed as integral parts thereof, and a head 9 which is provided with a flange to set into the end of the body portion, and the outer edge of which constitutes the wall of the rope-receiving space of the reel. The body portion 7 and the head 9 are both screw-threaded to a sleeve 11 which is loosely mounted on the stud 3. The body portion 7 is provided with a spring-receiving chamber 12 in which the usual spring 13 is situated, the outer end of said spring being secured to the reel and in the inner end being secured to the stud 3 preferably by forming said inner end of the spring with a square loop 14 which fits about the squared portion 15 of the stud, although this particular construction is not essential. The spring-receiving chamber 12 is closed by a plate 16 which is held in position by a pin 17 extending through the end of the stud 3. This particular construction of reel, however, is not essential to my invention, but is described herein merely as illustrating a practical mechanical construction.

As stated above the reel 9 has associated therewith one or more stop shoulders which are adapted to coöperate with a stop element movably mounted on the reel support. In the illustrated embodiment of my invention these stop shoulders are formed on the head 9 and I have shown four such stop shoulders, although any convenient number may be used. These stop shoulders are designated 18 and are formed on the outer face of the head 9, the latter being provided with the laterally-extending flange 19 which encircles the shoulders. The movable stop member is shown at 20 and is formed on and extends laterally from the end of an arm 21 that is pivoted to the reel support at 22. The head 9 is provided with a hub or cam portion 23 that is formed with as many points or rises 24 as there are stop shoulders 18, there being four in this embodiment of the invention. The cam 23 and the stop member 20 are situated so that under normal conditions when the reel is stationary or rotating slowly the stop member rests on the periphery of the cam, and when it occupies this position it is out of the path of movement of the shoulders 18, as shown in Fig. 3. I prefer to secure this relative position between the stop member 20 and the cam 23 by placing the stop member directly above the cam so that it will be held against the cam by gravity, as this arrangement simplifies the construction and avoids the necessity of springs and other devices for holding the stop member against the cam. As the reel rotates slowly, the stop member 20 will rise and fall as it passes over the points 24, but these points are so situated relative to the shoulders 18 that even such rising and falling movement does not bring the stop member into the path of the movement of the shoulder. If, however, the reel is rotated rapidly in the direction of the arrow Fig. 3, or in a direction to unwind the trolley rope 1, then the points 24 will act on the stop member 20 with sufficient force to throw the latter outwardly into the path of movement of the stop shoulders 18, and when this occurs, one of the stop shoulders engages the stop member 20, as shown in Fig. 4, and thus locks the reel from rotation.

The flange 19 coöperates with the stop shoulders 18 in that said flange and limits the outward swinging movement of the stop member 20 and insures that it will not be carried beyond the path of movement of the shoulder 18 when it is thrown into its operative position.

Inasmuch as the stop member 20 and shoulders 18 come into engagement with considerable force, I have provided means to relieve the pivot 22 from the strain due to the sudden impact of the shoulder against the stop member. In the construction herein shown the reel supporting member 5 is provided with an abutment surface 27 against which the portion 28 of the arm 21 comes into engagement when the arm is in its outward position, as shown in Fig. 4, and with this construction the impact of the shoulder 18 against the stop member will be transmitted directly to the abutment surface 27 rather than to the pivot 22. This avoids the danger of breaking the pivotal connection between the arm 21 and the reel-supporting member by the impact of the shoulder against the stop member.

It will be seen that my device comprises few parts but that it is positive in operation. It will be noted that the movable stop member is pivotally mounted on a fixed support and that it is thrown into its operative position by the force of a cam carried by and rotating with the reel. The device does not depend upon centrifugal force for throwing the movable stop member into operative position, but upon the force generated by a swiftly-moving cam member. It will also be noted that the stop shoulders 18 are slightly inclined. The advantage of this construction is that after the stop member 20 has been thrown into its operative position, as shown in Fig. 4, and has been engaged by a stop shoulder, the shape of the stop shoulder will serve to hold the stop member in its operative position so long as there is a strain on the trolley rope tending to unwind the drum. To release the stop member 20 it is merely necessary to turn the reel or drum forwardly sufficiently to disengage the stop shoulder from the stop member when the stop member 20 will drop by gravity into the position shown in Fig. 3 against the cam 23, in which position it is out of the path of movement of the shoulders 18.

In the illustrated embodiment of my invention the points 24 of the cam 23 are so situated that when the stop member 20 is riding over the points, said member is at that time in the path of movement of the inner ends of the shoulders 18, but as the points 24 are located between the shoulders 18, the stop member 20 is not brought into engagement with the shoulder in passing over the points 24 so long as it maintains its engagement with the cam. If, however, the movement of the cam is sufficiently rapid so that the engagement of the point 24 with the member 20 throws the latter outwardly, then it will be engaged by the shoulder 18 and thus lock the reel from further unwinding movement.

While any suitable bracket or holder 4 may be employed for detachably securing the trolley catcher to a trolley car, the construction I have herein illustrated has proved to be a practical one. This bracket 4 is provided with ears 30 by which it is secured to the trolley car and is provided with an opening 31, of a size to receive the square head 32 formed on the end of the hub 6. This opening 31 is provided with an extension 33 at the opposite edges of which are two lips 34. The hub 6 is provided with a neck portion 35 between the head 32 and the body 5, and this neck portion which is preferably rectangular, as shown in Fig. 4, is of a size to fit between the edges of the lips 34.

In attaching the trolley catcher to a car the head 32 is inserted through the opening 31 and then the trolley catcher is moved laterally to cause the neck 35 to enter the extension 33 and to bring the lips 34 behind the head 32 and into the groove or space between said head and the body 5. The trolley catcher is thus firmly held in position, but can be readily removed by giving it a lateral movement to bring the head into line with the opening 31.

To lock the trolley catcher in its operative position I have provided a pawl or dog which may be pivotally mounted on either the body 5 of the trolley catcher or the bracket and which is adapted to interlock with a projection carried by either the bracket or the body 5. In the illustrated embodiment of my invention the pawl or dog which is shown at 36 is pivoted to the body 5 at 37, and the projection which is designated 40 is shown as extending from the bracket 4. The pawl or dog is acted on by a spring 38 and has a shoulder 39 at its end to engage the projection 40. These parts are so arranged that when the trolley catcher has been properly placed in the bracket 4 the shoulder 39 of the pawl 36 will be automatically brought into locking engagement with the projection 40, thus firmly holding the trolley catcher in the bracket. The latch or pawl 36 is provided with an extension 41 constituting a finger piece by which it can be lifted out of locking engagement with the projection 40 when the trolley catcher is to be removed.

While I have illustrated herein a selected embodiment of my invention I do not wish to be limited to the constructional features shown.

I claim:

1. In a trolley catcher, the combination with a reel-supporting member, of a spring-actuated reel mounted thereon, a cam member rigid with the reel, said reel having a laterally-projecting flange encircling the cam member, and stop shoulders extending inwardly from the flange, a stop member pivotally mounted on the reel-supporting member and normally resting on said cam, the space between said cam and stop shoulder being sufficient to receive the stop member so long as the latter has engagement with the cam, said cam member throwing the stop member into the path of the shoulder when the reel rotates rapidly.

2. In a trolley catcher, the combination with a reel-supporting member, of a spring-actuated reel mounted thereon and having a stop shoulder associated therewith, a stop member pivotally mounted on the reel-supporting member and movable into and out of the path of movement of the shoulder, and a cam rigid with the reel and engaging the stop member, said cam operating to throw the stop member outwardly into the path of movement of the shoulder when the reel rotates rapidly.

3. In a trolley catcher, the combination with a reel-supporting member, of a spring-actuated reel mounted thereon and having a stop shoulder, a swinging stop member sustained by the reel-supporting member and normally occupying a position out of the path of movement of the shoulder, and a cam carried by the reel and adapted to throw the stop member into the path of movement of the shoulder when the reel rotates rapidly.

4. In a trolley catcher, the combination with a reel-supporting member, of a spring-actuated reel sustained thereby and provided with a plurality of stop shoulders, a stop member pivotally mounted on the reel-supporting member, a cam member rigid with the reel and provided with a rise or point for each stop shoulder, said points being situated between the stop shoulders whereby when the reel rotates rapidly the stop member will be thrown outwardly by the points into the path of movement of the shoulders.

In testimony whereof, I have signed my name to this specification, in the presence of two subscribing witnesses.

FRANCIS J. ROCHE.

Witnesses:
BERTHA F. HEUSER,
THOMAS J. DRUMMOND.